United States Patent
Zhou et al.

(10) Patent No.: US 6,402,931 B1
(45) Date of Patent: *Jun. 11, 2002

(54) ELECTROCHEMICAL MACHINING USING MODULATED REVERSE ELECTRIC FIELDS

(75) Inventors: Chengdong Zhou, Salem, OR (US); E. Jennings Taylor, Troy, OH (US); Jenny J. Sun, Tipp City, OH (US); Lawrence E. Gebhart, Clayton, OH (US); Robert P. Renz, Centerville, OH (US)

(73) Assignee: Faraday Technology Marketing Group, LLC, Troy, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,264

(22) Filed: May 18, 1998

(51) Int. Cl.$^7$ ................................................. B23H 9/02
(52) U.S. Cl. ................................. 205/659; 205/DIG. 9
(58) Field of Search ..................... 205/658, 659, 205/646; 204/DIG. 9

(56) References Cited

U.S. PATENT DOCUMENTS

| | | | |
|---|---|---|---|
| RE26,620 E | 7/1969 | Inoue | 204/224 |
| 3,616,346 A | 10/1971 | Inoue | 204/143 M |
| 3,654,116 A | 4/1972 | Inoue | 204/224 |
| 4,060,467 A | 11/1977 | Maeda et al. | 204/129.75 |
| 4,097,710 A | 6/1978 | Maillet | 219/69 D |
| 4,110,190 A | 8/1978 | Visser | 204/224 M |
| 4,113,587 A | 9/1978 | Chickamori | 204/129.1 |
| 4,153,524 A | 5/1979 | Roche et al. | 204/129.43 |
| 4,496,436 A | 1/1985 | Inoue | 204/23 |
| 4,655,888 A | 4/1987 | Kilcher et al. | 204/129.43 |
| 4,880,509 A | 11/1989 | Kuwabara et al. | 204/129.2 |
| 4,885,066 A | 12/1989 | Kuwabara et al. | 204/129.43 |
| 5,143,586 A * | 9/1992 | Ozaki et al. | 204/DIG. 9 |
| 5,242,556 A * | 9/1993 | Masuzawa | 204/DIG. 9 |
| 5,306,402 A | 4/1994 | Frembgen | 204/129.43 |
| 5,833,835 A * | 11/1998 | Gimaev et al. | 205/658 |

FOREIGN PATENT DOCUMENTS

SU 1440636 11/1988

* cited by examiner

*Primary Examiner*—Donald R. Valentine
(74) *Attorney, Agent, or Firm*—Vorys, Sater, Seymour and Pease LLP

(57) ABSTRACT

Electrochemical machining of metals and alloys is accomplished by using a pulsed electric current incorporating modulated reverse electric current. Reverse (cathodic) pulses are interposed between forward (anodic) pulses. The process is useful for electrochemical shaping of metals, electrochemically polishing metal surfaces, and electrochemical deburring of metal articles. The process is especially useful for electrochemical processing of metals and alloys that readily form passive surface layers.

17 Claims, 8 Drawing Sheets

ELECTROCHEMICAL MACHINING USING MODULATED REVERSE ELECTRIC FIELDS

ORIGIN OF THE INVENTION

The experimental work leading to this invention was funded in part by U.S. Air Force Materials Command Contracts No. F33615-96-C-5260 and No. F33615-97-C-5275.

BACKGROUND OF THE INVENTION

1. Field of the Invention

This invention relates to electrochemical machining of metals and alloys and more particularly to electrochemical machining of metals and alloys using modulated reverse current.

2. Brief Description of the Prior Art

Hard, high strength metals and alloys have come to be widely used in industry because of their favorable mechanical properties. Such alloys are useful, and even essential, for fabricating mechanical parts that have the mechanical strength and resistance to wear and corrosion that are required in modern industrial practice. Dies for manufacturing metal parts in the automobile and aircraft industries, parts for aircraft and aerospace vehicles, and parts for machine tools are typical uses to which these alloys have been applied. However, the hardness, wear resistance, and passivity of these metals and alloys that make them so useful also cause them to be very difficult and expensive to shape by conventional machining methods.

Accordingly, electrochemical machining (ECM) has come to be used as a method of preparing mechanical parts from such hard, high strength metals and alloys. In 'numerous cases, these hard, high strength metals and alloys are passive, i.e., they form a thin protective surface oxide film. ECM is effective because it generally provides a high rate of metal removal from the workpiece, it lends itself to the generation of complicated contours and profiles, tool wear is absent or minimal, and the machined surfaces are generally free from burrs and/or scratches. Because ECM is a non-mechanical metal removal process, it is applicable to machining of any electrically-conductive material without regard to the mechanical and/or thermal properties of the workpiece, such as hardness, elasticity and thermal conductivity. Consequently, the principles of electrochemical machining have been applied to removal of relatively large amounts of metal to generate structural structural shapes, as well as to electrochemical polishing, used to form smooth surfaces, and to electrochemical deburring, used to remove small protuberances, e.g., flash, burrs, and the like, on metal parts formed by other machining methods such as casting, metal cutting, forging, and the like. All these applications are often discussed under the general heading of electrochemical machining.

Electrochemical machining (ECM) is conducted in an electrolytic cell by applying a positive (anodic) potential to the workpiece and a negative (cathodic) potential to the tool used to shape the workpiece. In conventional ECM processes, continuous direct current is used. The interelectrode gap will vary, depending on the particular application. In conventional electrochemical machining, wherein substantial amounts of metal are removed, the interelectrode gap is relatively small, typically 0.5 mm to about 10 mm (although larger gaps may be used), and is often kept relatively constant by advancing the tool toward the workpiece as the workpiece surface is eroded. The rate of advance evidently is highly dependent on the conditions, such as current, electrolyte and the particular metal being formed, but is typically in the range of 0.1 to about 10 mm per minute. For electrochemical polishing, the gap is generally relatively small, typically 0.1 mm to 1 mm, and the tool is usually fixed with reference to the surface to be polished. For electrochemical deburring, the gap is relatively large, typically 5 mm to 50 mm, or even greater, and the tool is typically fixed. Electrolyte (typically an aqueous solution of $NaCl$ or $NaNO_3$) is supplied to flow through the gap to maintain the electrically conductive path for electrochemical dissolution on the workpiece surface and to carry away the waste products and heat generated by the electric current. In some applications, particularly electrochemical machining and electrochemical polishing, the electrolyte flow rate may be large, typically 10–60 meters per second.

In ECM, the dissolution rate of the metal from the surface of the workpiece, the surface finish, and the precision of the machined piece are related to the kinetics and stoichiometry of the electrode reactions. These parameters are strongly influenced by prevailing mass transport conditions. It is well known that the influence of local variations within the inter-electrode gap on mass transport rates and electrolyte conductivity due to the presence of gas bubbles and the resulting heating can be minimized by working at high electrolyte flow velocity. However, high electrolyte flow rates require an elaborate pumping system and a heavy machine frame to maintain rigidity. The resulting installation and operating costs present a major limitation to the wider application of the ECM process.

Particular difficulties have been encountered by both industrial and laboratory researchers in the conventional ECM of hard passive metals and alloys, such as surface defects and unsatisfactory dimensional accuracy control. Hard passive metals and alloys possess a high resistance to corrosion due to the formation of a thin protective oxide film on their surfaces. Therefore, high voltage or current is needed to break the oxide film during electrochemical machining of such materials. High voltage or current results in more undesired products and heat, which require higher electrolyte flow rates to remove. Additionally, the dimensional accuracy is poor due to 1) non-uniform electrolyte hydrodynamic conditions in the interelectrode gap caused by undesired products and heat, and 2) change in the tool size and shape caused by precipitation of metal hydroxide. Surface quality is also poor due to the cavitation caused by high electrolyte flow rate and gas bubbles leading to non-uniform hydrodynamic conditions in the gap. These problems, which are not, in fact, limited to ECM of passive materials, are discussed in Kozak, J., et al., "The Study of Thermal Limitation of Electrochemical Machining Processes", Transactions of NAMRI/SME, Vol. 15, pp. 159–164 (1997).

Recent research has focused on pulsed current electrochemical machining (PECM) to machine hard passive alloys, such as nickel-based superalloys and titanium alloys, and to improve dimensional accuracy and surface quality by 1) localizing current, 2) improving electrolytic hydrodynamic uniformity in the interelectrode gap by removing undesired products and heat during off-time, 3) reducing electrode gap, and 4) reducing the electrolyte flow rate. However, PECM also has some problems, especially for hard passive alloys. For the hard passive alloys, if sufficient oxygen is present, the oxide film is self-healing and reforms almost instantaneously, however non-uniformly, during the off-time in PECM. As a result, a partial film breakdown often occurs during the next on-time period, resulting in surface cavitation with pitting and high roughness. Additionally, the dissolved metal from the workpiece may precipitate near the cathode (tool) due to the high pH layer generated during the hydrogen evolution reaction at that electrode. The possible deposit of metal hydroxide on the cathode (tool) will change the tool size and shape. Consequently, dimensional accuracy becomes poor.

Accordingly, a need has continued to exist for a method of electrochemical machining that avoids the difficulties experienced with the procedures of the prior art.

SUMMARY OF THE INVENTION

The problems encountered in conventional electrochemical machining (ECM) and pulsed current electrochemical machining (PC ECM) processes have now been alleviated by the method of the invention wherein a modulated reverse electric field is used in the electrochemical machining process (MR-ECM).

Accordingly, it is an object of the invention to provide a method of electrochemical machining.

A further object is to provide a method of electrochemical machining using modulated reverse-field electrolysis.

A further object is to provide a method of electrochemical machining adapted to the shaping of passive metals and alloys.

A further object is to provide a method of electrochemical machining with improved dimensional accuracy.

A further object is to provide a method of electrochemical machining that improves dimensional accuracy by localizing the electric current.

A further object is to provide a method of electrochemical machining that improves hydrodynamic uniformity of the electrolyte within the interelectrode gap.

A further object is to provide a method of electrochemical machining that reduces or prevents deposition of metal hydroxides on the tool.

A further object is to provide a method of electrochemical machining that improves dimensional accuracy by reducing the interelectrode gap.

A further object is to provide a method of electrochemical machining that decreases and controls the pH of the electrolyte near the tool (cathode).

A further object is to provide a method of electrochemical machining that improves the surface quality of the machined workpiece.

A further object is to provide a method of electrochemical machining that reduces cavitation in the interelectrode gap caused by non-uniform hydrodynamic conditions.

A further object is to provide a method of electropolishing surfaces of metal objects.

A further object is to provide a method of electropolishing surfaces of passive metals and alloys.

A further object is to provide a method of electrochemical deburring of metal objects.

A further object is to provide a method of electrochemical deburring of objects made from passive metals and alloys.

A further object is to provide a method for reducing or eliminating the formation of a passive layer on a workpiece in electrochemical machining, electrochemical polishing and electrochemical deburring.

Further objects of the invention will become apparent from the description of the invention which follows.

DETAILED DESCRIPTION OF THE INVENTION AND PREFERRED EMBODIMENTS

According to the invention, the rate of electrochemical machining and the accuracy and surface appearance of the machined object are improved by employing a modulated reverse electric field to remove metal from a workpiece.

Figure 1:
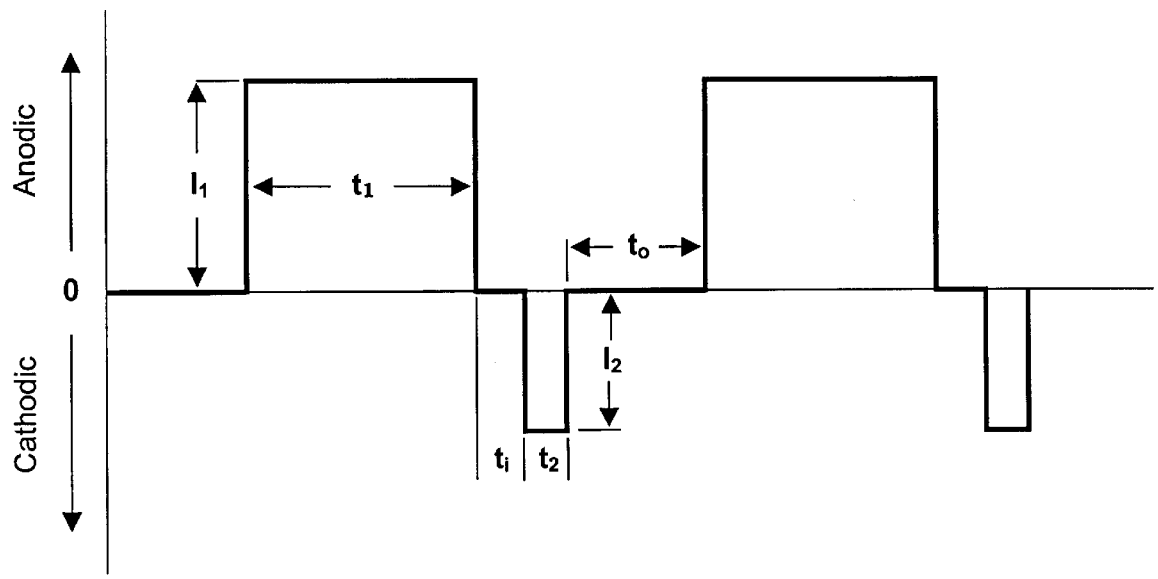
FIG. 1 illustrates the waveform of modulated reverse electric current used in the method of the invention.

A schematic representation of a rectangular modulated reverse electric field waveform used in the process of the invention is illustrated in FIG. 1. The waveform essentially comprises an anodic (forward) period followed by a cathodic (reverse) period. An off period or relaxation period may follow the cathodic period and an intermediate off period may be interposed between the anodic period and the cathodic period. Those skilled in the art will recognize that the voltage and current will be proportional under the circumstances of the electrolytic process of the invention. Accordingly, the ordinate in FIG. 1 could represent either current or voltage. Although it is generally more convenient in practice to control the voltage, the technical disclosure of the process is more straightforward if discussed in terms of the current flow. Furthermore, the waveform need not be rectangular as illustrated. The anodic and cathodic pulses may have any voltage-time (or current-time) profile. In the following discussion rectangular pulses are assumed for simplicity. Again, one skilled in the art will recognize that the point in time chosen as the initial point of the pulse train is entirely arbitrary. Either the anodic pulse or the cathodic pulse (or any point in the pulse train) could be considered as the initial point. The representation with the anodic initial pulse is introduced for simplicity in discussion.

In FIG. 1, the anodic peak current is shown as $I_1$ and the anodic on-time is $t_1$. Similarly, the cathodic peak current is shown as $I_2$ and the cathodic on-time is $t_2$. The relaxation time, or off-time is $t_o$, and the intermediate period is shown as $t_i$. The sum of the anodic on-time, cathodic on-time, relaxation period, and intermediate period (if present) is the period T of the pulse train ($T=t_1+t_2+t_o+t_i$), and the inverse of the period of the pulse train (1/T) is the frequency (f) of the pulse. The ratio of the anodic on-time to the period ($t_1/T$) is the anodic duty cycle ($D_1$), and the ratio of the cathodic on-time to the period ($t_2/T$) is the cathodic duty cycle ($D_2$). The current density, i.e., current per unit area of the electrode, during the anodic on-time and cathodic on-time is known as the anodic peak pulse current density and cathodic peak pulse current density, respectively. The anodic charge transfer density ($Q_1$) is the product of the anodic current density and the anodic on-time ($I_1T_1$), while the anodic charge transfer density ($Q_2$) is the product of the cathodic current density and the cathodic on-time ($I_2T_2$). The average current density ($i_{ave}$) is the average anodic current density ($D_1I_1$) minus the average cathodic current density ($I_2D_2$). Accordingly the relationships among the parameters may be represented by the following equations.

$$T = \frac{1}{f} = t_1 + t_2 + t_o + t_i \tag{1}$$

$$D_1 = \frac{t_1}{T} \tag{2}$$

$$D_2 = \frac{t_2}{T} \tag{3}$$

$$\frac{Q_1}{Q_2} = \frac{i_1 t_1}{i_2 t_2} \tag{4}$$

$$i_{ave}=i_1D_1-i_2D_2 \tag{5}$$

$$D_1+D_2 \leq 1 \tag{6}$$

The application of modulated reverse current (or electric field) in pulsed current electrochemical machining can alleviate a number of the problems experienced in both direct current (DC) ECM and pulsed current (PC) ECM. When the electric current is first applied between the tool (cathode) and workpiece (anode) the passive surface layer that is characteristic of hard passive alloys is broken down. As long as the current is applied, continuous anodic dissolution of the workpiece prevents the reformation of the passive surface. However, during DC ECM the formation of gas bubbles in the interelectrode gap, chiefly hydrogen gas formed at the cathode, and the precipitation of dissolved metal, chiefly as hydroxide due to reaction with hydroxyl ions generated at the cathode, cause the current path through the narrow electrolyte layer between the electrodes to be very inhomogeneous. This inhomogeneity can lead to variations in the rate of erosion from point to point over the surface of the workpiece and to corresponding roughness of the machined surface. Polarization of the electrodes, in spite of high electrolyte flow rates, may limit the machining rate.

In order to improve the dimensional accuracy of ECM, pulsed current ECM (PC ECM, sometimes referred to in the literature as PECM) has been adopted. By interrupting the anodic current with periods of no current flow, PC ECM allows time for the products of electrolysis, gas bubbles, precipitates, dissolved metal ions, and the like, to be removed from the interelectrode gap by the electrolyte flow. The improved electrolyte homogeneity leads to enhanced localization of anodic dissolution and permits smaller interelectrode gaps and thereby higher dimensional accuracy, better process stability, simpler tool design, and better on-line process control. An analysis of the characteristics of PC ECM is found in K. P. Rajurkar et al., "Study of Pulse Electrochemical Machining Techniques", Annals of CHIRP, Vol. 42, No. 1, pp. 231–234 (1993).

However, PC ECM also introduces problems due to the reformation of the surface passive layer on the workpiece during the off-current intervals by reaction of the surface metal atoms with oxygen dissolved in the electrolyte. The passive layer can form very rapidly at the oxygen levels typically found in the circulating electrolyte. However, the passive layer so formed may not be of uniform thickness over the entire surface of the workpiece. Consequently, when the next pulse is applied, the breakdown of the passive layer may not occur uniformly and simultaneously over the entire surface of the workpiece. Hence the metal removal achieved by each pulse may not be the same everywhere, and an increase in surface roughness may be observed. Furthermore, the problem of non-uniform hydrodynamic conditions is not eliminated. Hydrogen gas bubbles form essentially instantly at the cathode as soon as each forward (anodic) pulse is applied. The gas bubbles cause an increase in the electrical resistance of the layer of electrolyte closest to the cathode, which results in greater power dissipation in that layer and greater heating of that layer. Accordingly the layer of electrolyte closes to the cathode has a lower density and lower viscosity than the remainder of the electrolyte in the interelectrode gap. The layer of electrolyte closest to the cathode (tool) therefore tends to flow more rapidly than the layer of electrolyte closer to the workpiece. Furthermore, the bubbles in the layer close to the cathode make that layer less dense, which also tends to cause a faster flow rate adjacent to the tool. The more rapid flow close to the tool causes an inhomogeneous flow condition in the interelectrode gap that contributes to cavitation at the workpiece and a rough workpiece surface. The bubbles in the layer of electrolyte close to the cathode (tool) also contribute to an electrical inhomogeneity as well. The electric current can flow only in the electrolyte between the bubbles, which evidently causes the current path to be tortuous and continuously changing in direction and effective length between the electrodes. Thus, the electric field between the tool and workpiece is distorted and variable in both space and time coordinates. This condition contributes to non-uniform removal of metal from the surface of the workpiece. Accordingly, the formation of hydrogen gas bubbles in the electrolyte, with the consequential non-uniform hydrodynamic conditions within the interelectrode gap, can result in non-uniform electrical conductivity across the gap, a non-uniform electric field at the anode, and a non-uniform hydrodynamic flow field of the electrolyte, all of which can contribute to an increase small scale roughness on the surface of the workpiece. Thus, although PECM introduces a quiescent period during which no electrolysis occurs and products of the electrolytic pulse are flushed out of the interelectrode gap, formation of bubbles is rapidly initiated at the next pulse, typically hydrogen gas at the cathode and possibly oxygen at the anode, and the inhomogeneous electrical and hydrodynamic conditions are rapidly regenerated.

Introduction of cathodic pulses between the anodic pulses can help to control some of the conditions that cause non-uniform metal removal from the workpiece in ECM, and thereby contribute to more accurate conformity of the workpiece surface to the tool surface as well as to a microscopically smoother workpiece surface. It is believed that during the cathodic pulse of the MR-ECM process, the reversed electric field has the effect of anodically consuming some of the hydrogen generated at the tool surface during the forward (anodic) pulse, thereby reducing the pH of the electrolyte near the tool surface and decreasing the amount of precipitated metal hydroxides and the like, as well as eliminating or minimizing the adverse effect of bubble formation in the interelectrode gap.

Furthermore, at the workpiece, the cathodic pulse will tend to cathodically consume the nascent oxygen or cathodically reduce the oxide film, thereby reducing or eliminating the adverse effects due to the formation of a non-uniform oxide film. Consequently, when the next anodic pulse is applied, any passive layer that may have formed will be more easily broken down, and therefore less capable of forming local islands of passivity that tend to resist erosion of the underlying metal. Accordingly, the method of the invention is preferably applicable to workpieces that are essentially entirely metallic in structure, whereby the effect of the cathodic reaction at the workpiece surface is effective over essentially the entire surface.

A further advantage of MR-ECM arises from the greater uniformity of electrolyte flow. As pointed out above, ECM ordinarily requires high electrolyte flow rates to flush away heat, gas bubbles, and the precipitate products. These problems are more severe for ECM of passive alloys because relatively higher voltages (with consequential higher currents) are required to break down the passive surface layer. In MR-ECM any undesired electrolysis products are removed during the off time and reverse pulse period. Furthermore, anodic consumption of hydrogen at the tool during the cathodic (reverse) pulse tends to reduce the amount of bubble formation. Consequently, the non-uniform flow conditions resulting from greater heating of the electrolyte layer nearest the tool and the decreased density of that layer due to the presence of the bubbles, as discussed above, are at least mitigated. The reduction in hydrogen bubble formaation also reduces the distortion of the electric field in the interelectrode gap. Accordingly, the detrimental effects due to generation of hydrogen bubbles near the tool are alleviated by MR-ECM. Consequently, the uniformity of electrolyte properties is maintained, fluctuations in the properties are minimized, and hydrodynamic uniformity is maintained in the interelectrode gap. The improved electrolyte uniformity in the interelectrode gap leads to better control of dimensional accuracy. It also favors a smoother surface because the microscopic current distribution tends to be controlled primarily by the interelectrode distance, which favors erosion of small peaks on the workpiece surface. The danger of short circuit due to the accumulation of gas bubbles is also reduced. Furthermore, the electrolyte flow rate itself can be reduced because heat and undesired products of electrolysis are removed during the off-time and/or cathodic pulse time. This in turn makes for more economical installation and operation of the ECM equipment.

The frequency of the pulse train used in the method of the invention may range from about 5 Hertz to about 500 Hertz, preferably from about 10 Hz to about 300 Hz and more preferably from about 10 Hz to about 100 Hz. Accordingly, the anodic and cathodic pulse widths may vary from about 1.0 millisecond to about 200 milliseconds, with the proviso that cathodic pulses are introduced between at least some of the anodic pulses. It is not excluded that two or more cathodic pulses may be introduced between a pair of anodic pulses.

The method of the invention is applicable to electrochemical removal of metal from a substrate in a number of industrial applications. The technique of the invention may be used in conventional electrochemical machining wherein relatively large amounts of metal are removed from a workpiece to impart a particular shape. This aspect of the invention may be referred to as electrochemical shaping. Electrochemical metal removal is also used in electropolishing of metal surfaces that have been prepared by other metal shaping or forming procedures such as casting, forging, extrusion, hydraulic forming, mechanical metal cutting, grinding, spark erosion machining and the like. Electrochemical metal removal may also be used in electrochemical deburring of parts formed by other metal shaping methods, such as casting, metal cutting and the like, that tend to leave small protuberances on at least some portions of the shaped surface. For example, metal die casting often leaves a flash on the workpiece at the mold parting line, and metal cutting and drilling often leave burrs on the cut edges of the metal. Although each of these procedures may each be improved by the use of MR-ECM, the conditions for optimum application of MR-ECM will in general be somewhat different.

The pulse widths and duty cycle of the pulse train may vary widely, although certain combinations of pulse width and duty cycle will be particularly relevant to particular applications. Thus, the anodic duty cycle may range from about 1% to about 95%, and the cathodic duty cycle may correspondingly range from about 95% to about 1%. Of course, the pulse width, duty cycle, and applied voltage of the cathodic pulse must be adjusted to provide that the overall process is anodic, i.e., there is a net removal of metal from the anode workpiece. The practitioner will adapt the pulse width and duty cycle to a particular application, based on the principles and teachings of the process of the invention.

In conventional ECM for shaping metal substrates, efficient removal of metal from the anode together with accurate formation of the profile of the workpiece and a good surface finish is favored by a relatively non-uniform electric current distribution in the interelectrode gap, whereby the surface of the workpiece is conformed to the shape of the advancing tool. The appropriate conditions are generally achieved by a relatively short anodic pulse, typically from about 2 ms to about 100 ms, preferably from about 5 ms to about 60 ms, and an anodic duty cycle from about 5% to about 60%, preferably from about 25% to about 35%. The cathodic pulse may have a pulse width from about 5 ms to about 150 ms, preferably from about 5 ms to about 50 ms, and a duty cycle of from about 10% to about 60%, preferably from about 25% to about 40%.

For electropolishing of metal surfaces, where the tool generally conforms to the shape of the surface are to be polished and is generally fixed with respect to that surface, a generally uniform current distribution in the interelectrode gap is desired. Accordingly, the anodic pulse width will typically be from about 10 ms to about 120 ms, preferably from about 20 ms to about 70 ms, and the anodic duty cycle will be from about 40% to about 90%, preferably from about 60% to about 80%. The cathodic pulse for electropolishing may have a pulse width from about 3 ms to about 60 ms, preferably from about 8 ms to about 40 ms, and a duty cycle of from about 10% to about 50%, preferably from about 20% to about 40%.

For electrochemical deburring procedures and the like, where the interelectrode gap is relatively large and usually fixed, the electric current is preferably focused on projections from the surface of a massive article. Accordingly, short anodic pulses are favored, typically from about 1 ms to about 50 ms, preferably from about 1 ms to about 30 ms. The anodic duty cycle may range from about 5% to about 60%, preferably from about 10% to about 35%. The cathodic pulse may have a pulse width from about 5 ms to about 150 ms, preferably from about 5 ms to about 50 ms, and a duty cycle of from about 5% to about 60%, preferably from about 10% to about 35%.

For all MR-ECM processes, the off-time to and intermediate time $t_i$, may vary widely. Generally the time when no current is flowing, i.e., $t_o$ and $t_i$, are preferably small. Each may vary from zero to about 100 ms, and may be adjusted depending on such conditions as the electrolyte flow rate and the amount of heat and waste products that have to be removed from the interelectrode gap. In a preferred embodiment both off-time $t_o$ and intermediate time $t_i$ are zero. When $t_o$ is zero, the cathodic reduction of the oxide film occurs immediately before the anodic pulse, which may help to assure that the passive surface film is absent or of minimal thickness when the anodic pulse arrives. In this way rapid and uniform removal of metal from the workpiece is favored. The skilled practitioner will understand that, in each of the processes to which MR-ECM may be applied, the parameters of the pulse waveform, $t_1$, $t_2$, $t_i$, and $t_o$, may be widely varied depending on the composition of the workpiece, the composition of the tool and the composition of the electrolyte, in order to achieve rapid machining with accurate control of the machined shape of the workpiece and a smooth finished surface on the workpiece.

Because the invention is believed to operate by controlling the electrochemical reactions at the surfaces of the tool and workpiece, it is particularly well adapted to forming of workpieces that are composed essentially of metal and are therefore electrically conductive over essentially the entire surface that is in contact with the electrolyte.

The use of MR-ECM according to the invention is applicable to electrochemical machining methods for any metal that can be electrolytically dissolved and removed from a surface. The method is useful for electrochemical machining of, including electrochemical polishing and electrochemical deburring, of such materials as carbon steels and alloy steels, copper, zinc, tin, lead and alloys thereof such as brass, bronze, pewter, conventional die casting alloys (typically zinc-based), and the like. The process is especially useful in electrochemical machining of metals and alloys that form passive oxide films on their surfaces. Such metals and alloys present certain problems in electrochemical machining as discussed above. The process is especially useful with hard passive alloys that are difficult to shape by other processes such as conventional mechanical machining. Aluminum and its alloys, for example, alloys A96061, A93003, and A13560, as well as magnesium and its alloys can be electrochemically machined, polished and deburred using MR-ECM. Nickel and nickel-based superalloys, cobalt and its alloys, chromium and its alloys, molybdenum and its alloys, titanium and its alloys, e.g., Ti-64, hot worked tool steels, e.g., alloy T20813 (H-13) and tool steels such as T51620 (P-20), are materials that can be shaped, polished and deburred using MR-ECM. The alloy identification numbers herein are those used in the Unified Number System published by SAE/ASTM.

The electrolyte used with the MR-ECM of the invention is preferably a conventional, generally neutral electrolyte. Such electrolytes are aqueous solutions of neutral salts such as sodium chloride, sodium nitrate, and the like. Similarly, the tool used in the MR-ECM process of the invention may be made of any conventional material used in electrochemical machining, electropolishing or electrochemical deburring. Such materials as stainless steel, brass, bronze and the like may be used.

As indicated above, the interelectrode gap used in the process of the invention will fall in the typical range for the particular application for which MR-ECM is being used. For electrochemical shaping the gap will typically be form about 0.5 mm to about 10 mm, although smaller gaps, even 0.05 mm, and larger gaps can be used if appropriate. For electrochemical polishing the gap will typically be in the range form about 0.1 mm to about 1 mm, although, again smaller gaps and somewhat larger ones may be used. For electrochemical deburring, the interelectrode gap is typically from about 5 mm to about 50 mm, although even larger gaps can be used, and smaller gaps could be useful in special applications.

The invention will be illustrated by the following examples, which are intended to be illustrative and not limiting.

EXAMPLE 1

This example illustrates the use of modulated reverse electric fields in electrochemical shaping of a hard passive alloy.

Figure 2:
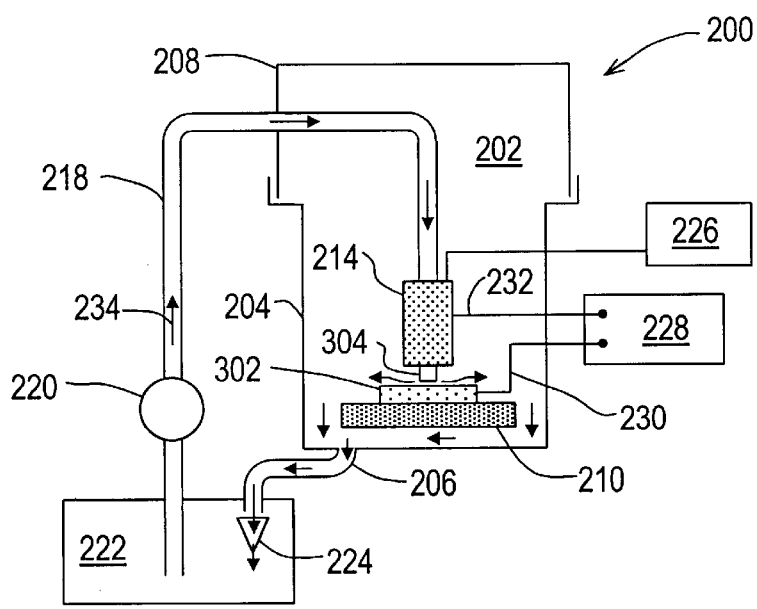
FIG. 2 is a schematic diagram of the apparatus used in the tests reported in Example 1.

The experiments were conducted in an electrochemical machining apparatus 200 as illustrated in FIG. 2. The operating parts of the apparatus were enclosed in an apparatus chamber 202 comprised of a stainless steel tank 204 provided with a drain 206 and fitted with a cover 208 of transparent acrylic plastic sheet. A workpiece holder 210 is mounted near the bottom of the tank 204 with adequate spacing from the walls and bottom of the tank to allow for drainage of electrolyte. A workpiece 302 is supported on workpiece holder 210 for machining in the experiments. A tool holder 214 is mounted above the workpiece holder 210, and is supplied with electrolyte through electrolyte conduit 218. The tool holder 214 includes conventional means for mounting a tool 304 and moving the tool 304 in a vertical axis under control of a tool feed controller 226. Electrolyte is pumped by pump 226 from electrolyte holding tank 222 to the tool holder 214 and tool 304 through electrolyte conduit 218. The test tool was a hollow cylinder with its axis mounted vertically in the tool holder 214. Electrolyte, circulated through the apparatus 200 as indicated by the flow arrow 234, is supplied to the tool 304, flows through the central bore, and exits between the lower end of the tool 304 and the workpiece 302. The electrolyte then returns to the electrolyte holding tank 222 through drain 206 and filter 224. Electric current is supplied to the tool 304 and workpiece 302 by the power supply 228 through electrical leads 230 and 232. The power supply is capable of supplying direct current, pulsed current or modulated reverse current at controlled voltages and with controlled pulse widths, frequencies and duty cycles.

Figure 3A:
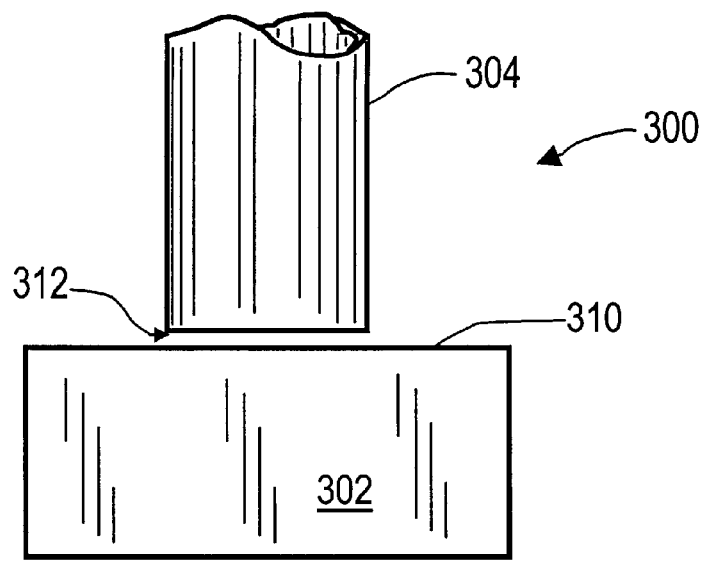
FIG. 3A is an elevational view of the tool and workpiece arrangement used in the tests of Example 1 showing the initial position of the tool and workpiece.

In the experiments of this example, the electrolyte was an aqueous solution of sodium nitrate containing 270 g/l of $NaNO_3$. The experiments were conducted at room temperature. The tool 304 was a stainless steel cylinder, having an outside diameter of 9.5 millimeters and a wall thickness of 1.5 millimeters (internal diameter 6.5 millimeters). The tool was wrapped in insulating tape 306 for most of its length leaving only a small length of the outside of the tool 304 exposed at the lower end. The alloy chosen for the workpiece in the experiments was IN718, a nickel-chromium alloy. Coupons of the alloy were prepared having a length of 55 mm, a width of 25 mm and a thickness of 14 mm. Before each experiment the coupons was weighed and mounted on the workpiece holder 210 of the apparatus. The initial arrangement of the tool 304 and workpiece 302 is shown schematically in FIG. 3A. The pump was then started to circulate the electrolyte from the holding tank 222 through the tool 304 at the machining station at the selected flow rate. The electrolyte flow rate was 11 L/min for the electrochemical machining using direct current (ECM), and 9 L/min for the runs using pulsed current (PECM) and modulated reverse field electrochemical machining (MR-ECM). The corresponding flow velocity through the central channel of the tool was 23 m/s and 18 m/s, respectively, for the flow rates of 11 L/min and 9 L/min. After the electrolyte circulation had been established, the power supply was turned on to establish a flow of electric current between the tool and the workpiece.

Figure 3B:
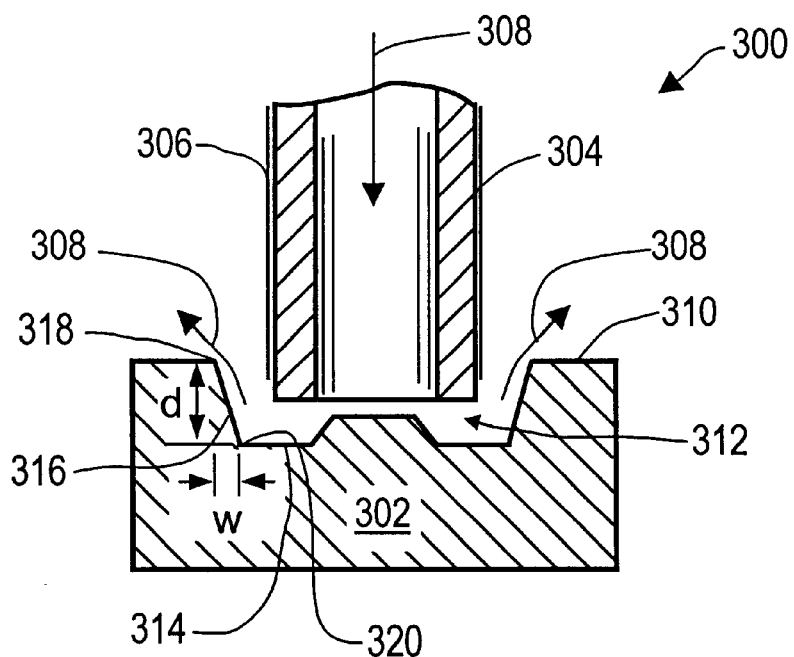
FIG. 3B is a schematic elevational cross-section view of the tool and workpiece used in the tests of Example 1 after an electrochemical machining test has been completed.

For the direct current test (ECM) the voltage supplied to the electrolytic cell was controlled at 30 V, and the test was conducted for a period of 30 seconds. For the pulsed current (PECM) and modulated reverse-field ECM (MR-ECM) tests, the voltage of each anodic pulse was controlled at 30 V. The length of the machining experiment was adjusted according to the duty cycle of the pulse train so that in each experiment the total time that voltage was applied to the electrolytic cell in an anodic direction was 30 seconds. That is, the total duration of the anodic pulses was 30 seconds. In the MR-ECM tests the voltage during the cathodic portion of the cycle was limited to 1.2 volts to prevent dissolution of the metal tool. The initial machining gap (i.e., the interelectrode gap 312 between the tool 304 and workpiece 302) was 0.26 mm. The tool feed rate was 0.6 mm/min during the test. The flow of electrolyte through the tool 302 and interelectrode gap 312 is indicated by the flow arrows 308. After the test, the workpiece was weighed again to determine the weight loss during the machining process. The test procedure produced a depression or pocket in the surface of the workpiece, as shown in cross-section in FIG. 3B. The machined surfaces were inspected with a microscope to measure the size of electromachined pocket and to evaluate the surface condition, rough, smooth, dull, shiny, and the like. As may be seen in FIG. 3B, the machined pocket has the shape of a depressed ring corresponding to the cylindrical tool. The electrochemically machined cavity has a relatively flat bottom 314 that is generally parallel to the initial surface 310 and sidewall 316. A raised portion in the center of the pocket corresponds to the central bore of the tool, and is not significant in the measurement of the results of the experiment. The sidewall 316 is not exactly perpendicular to the initial surface 310 and bottom 314. The depth of the pocket is indicated by "d" in FIG. 3B and may be determined by measuring the difference between the positions of the microscope objective lens when focused first on the top corner 318 of the sidewall 316 and then on the bottom corner 320. The inward slant of the sidewall 316 may be determined by measuring difference between the location of the top corner 318 and the bottom corner 320 of the wall, indicated as distance "w" in FIG. 3B. Evidently the ratio of w to d can serve as a measure of the machining accuracy. Generally speaking, the smaller the dimension "w" can be made, the better the machining accuracy. In the ideal situation "w" would equal zero and the sidewall 316 would be perpendicular to the initial face 310. A greater machining depth "d" for a particular machining time indicates a higher the machining rate, and a larger slope of the sidewall ("d/w") indicates better machining accuracy. Accordingly, the amount of metal removed and the dimensions "d" and "w" of the sidewall were measured after the machining tests. The experimental conditions of each experiment are summarized in Table 1, and the results are summarized in Table 2.

TABLE 1

Summary of Experimental Conditions

| Test | $T_{anodic}$ (ms) | $T_{cathodic}$ (ms) | $T_{off}$ (ms) | Frequency (Hz) | Anodic duty cycle (%) |
|---|---|---|---|---|---|
| DC | — | — | — | — | — |
| PC1 | 50 | | 10 | 17 | 83% |
| PC2 | 90 | | 10 | 10 | 90% |
| PC3 | 20 | | 10 | 33 | 67% |
| PC4 | 10 | | 20 | 33 | 33% |
| MRC1 | 50 | 10 | | 17 | 83% |
| MRC2 | 90 | 10 | | 10 | 90% |
| MRC3 | 20 | 10 | | 33 | 67% |
| MRC4 | 10 | 20 | | 33 | 33% |

TABLE 2

Experimental Results

| Experimet | Conditions | Mass loss (g) | Machining depth (mm) | Slope (d/w) | Machining rate (g/sec) | Surface appearance |
|---|---|---|---|---|---|---|
| DC | direct current | 0.26 | 0.39 | 0.65 | 0.0086 | dull |
| PC1 | 50 ms on; 10 ms off (f = 16 Hz, Da = 83%) | 0.34 | 0.43 | 0.71 | 0.011 | semi-shiny |
| PC2 | 90 ms on; 10 ms off (f = 10 Hz, Da = 90%) | 0.29 | 0.45 | 0.56 | 0.0096 | semi-shiny |
| PC3 | 20 ms on; 10 ms off (f = 33 Hz, Da = 67%) | 0.43 | 0.60 | 0.85 | 0.0143 | semi-shiny |
| PC4 | 10 ms on; 20 ms off (f = 33 Hz, Da = 33%) | 0.69 | 1.13 | 1.26 | 0.023 | shiny |
| MRC1 | 50 ms anodic; 10 ms cathodic (f = 16 Hz, Da = 83%) | 0.28 | 0.43 | 0.53 | 0.0093 | semi-shiny |
| MRC2 | 90 ms anodic; 10 ms cathodic (f = 10 Hz, Da = 90%) | 0.20 | 0.26 | 0.37 | 0.0066 | semi-shiny |
| MRC3 | 20 ms anodic; 10 ms cathodic (f = 33 Hz, Da = 67%) | 0.62 | 0.76 | 0.89 | 0.020 | shiny |

TABLE 2-continued

Experimental Results

| Experimet | Conditions | Mass loss (g) | Machining depth (mm) | Slope (d/w) | Machining rate (g/sec) | Surface appearance |
|---|---|---|---|---|---|---|
| MRC4 | 10 ms anodic; 20 ms cathodic (f = 33 Hz, Da = 33%) | 0.83 | 1.20 | 1.46 | 0.027 | very shiny |

Figure 4:
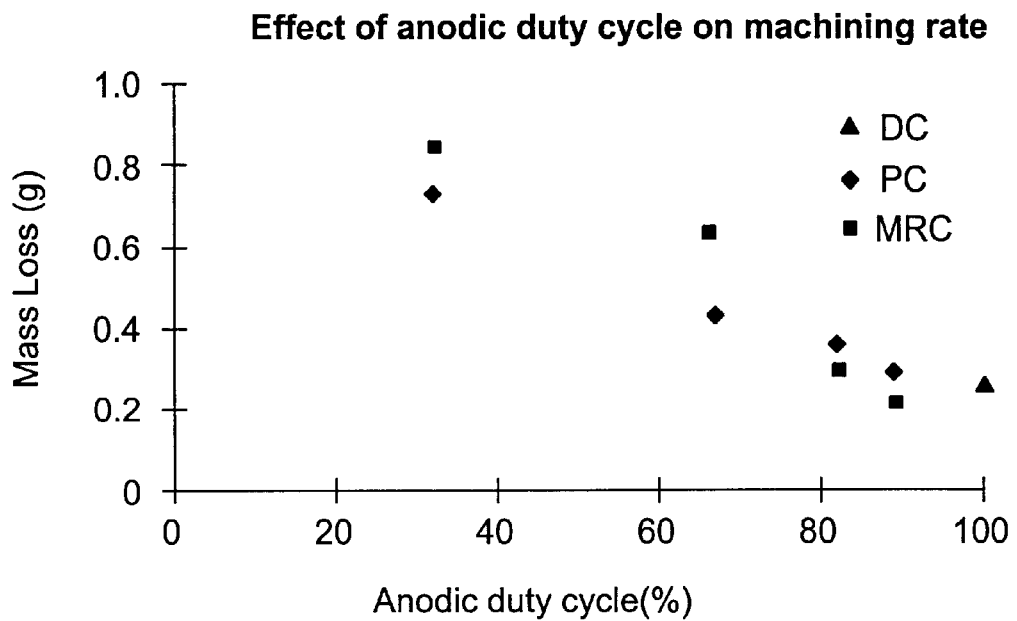
FIG. 4 is a plot showing the effect of anodic duty cycle on the machining rate in the experiment of Example 1.
Figure 5:
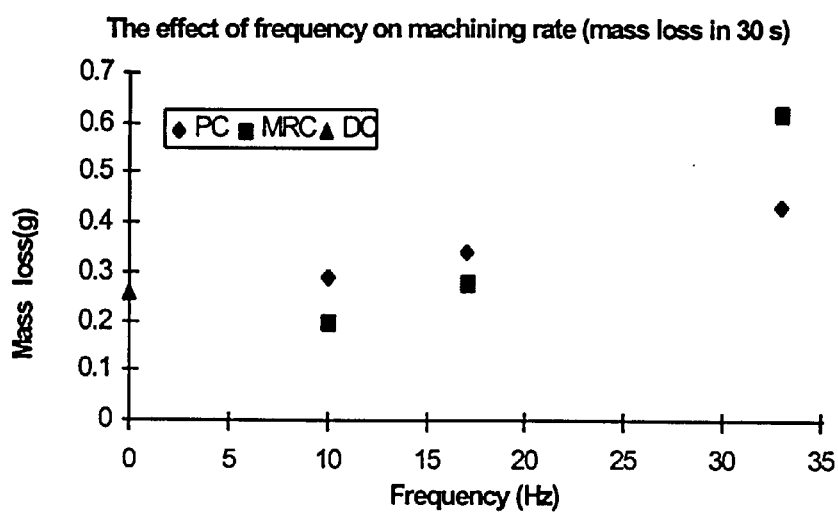
FIG. 5 is a plot showing the effect of frequency on the machining rate in the experiments of Example 1.

The results of the experiments are plotted in FIGS. 4 and 5 to show the effect of anodic duty cycle and frequency on machining rate. It can be seen that both pulsed current and modulated reverse current electrolysis according to the invention give results superior to those attained with DC electrolysis. As the duty cycle decreases, the rate of metal removal for equal total anodic electrolysis time increases. The use of modulated reverse field electrolysis shows a superior rate of metal removal at the shorter duty cycles. Similarly, the rate of metal removal increases as the frequency of the pulsed current increases for both pulsed current machining and modulated reverse current machining. At higher frequencies, pulsed reverse current machining shows a rate of metal removal significantly greater than either DC or pulsed current machining.

Figure 6:
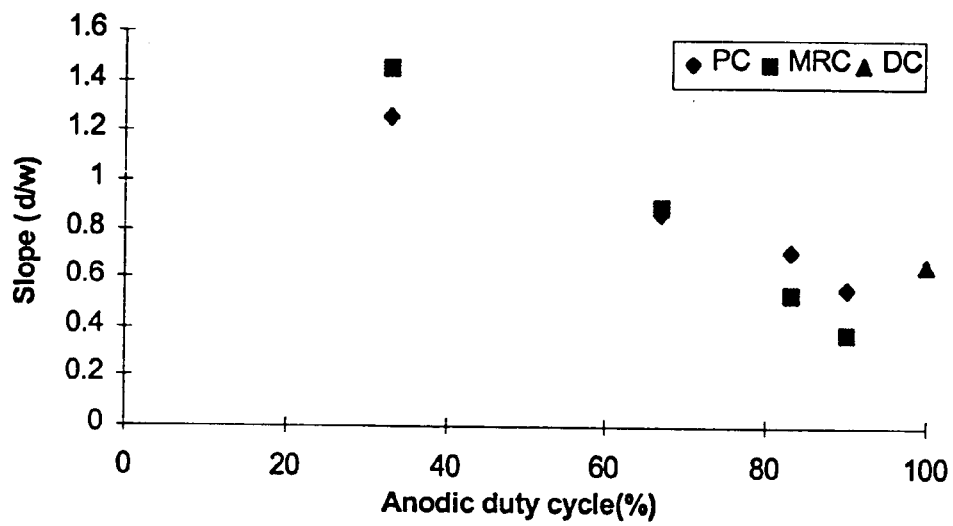
FIG. 6 is a plot showing the effect of anodic duty cycle on machining accuracy.
Figure 7:
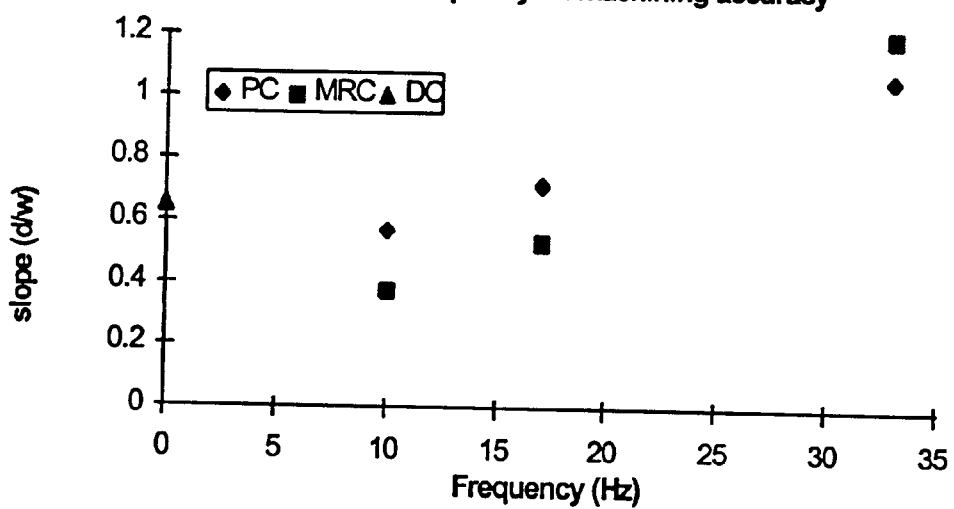
FIG. 7 is a plot showing the effect of frequency on machining accuracy.

The results of the experiments are plotted in FIGS. 6 and 7 to show the effect of anodic duty cycle and frequency on machining accuracy, as measured by the slope d/w of the sidewall of the machined pocket. It can be seen that, as the anodic duty cycle is decreased, both pulsed current and modulated reverse current machining according to the invention give results superior to those attained with DC machining. As the duty cycle decreases, the slope of the sidewall increases for equal total anodic electrolysis time. The use of modulated reverse field electrolysis shows a machining accuracy superior to that of pulsed current machining at the shorter duty cycles. Similarly, the machining accuracy increases as the frequency of the pulsed current increases for both pulsed current machining and modulated reverse current machining. At higher frequencies, pulsed reverse current machining exhibits more accurate machining than either DC or pulsed current machining.

Figure 8:
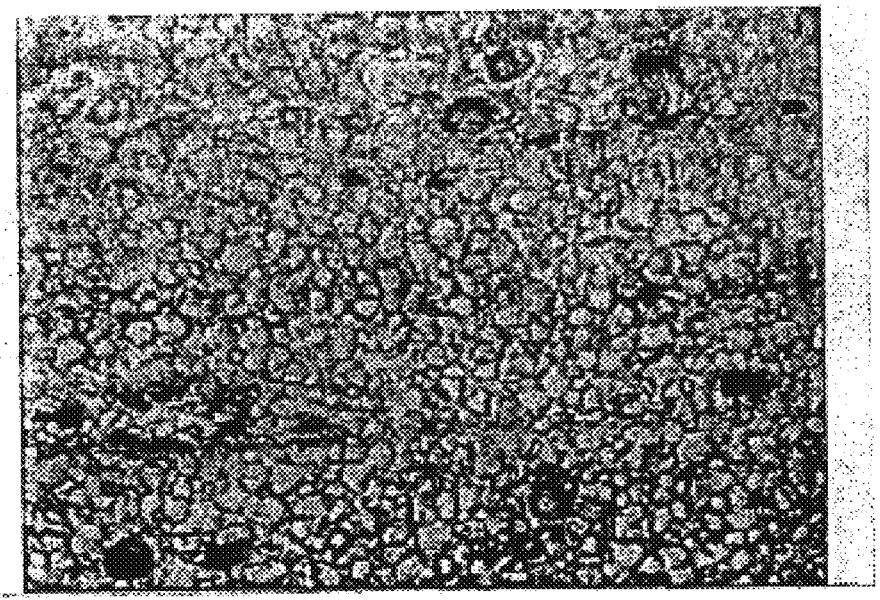
FIG. 8 is a photomicrograph at 200× showing the surface texture of a coupon subjected to conventional electrochemical machining using direct current in the experiment of Example 1.
Figure 9:
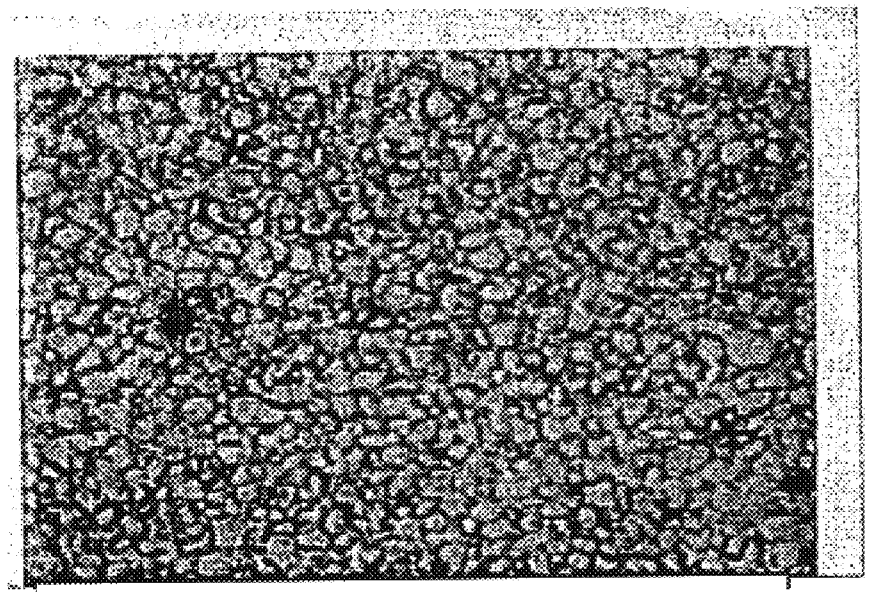
FIG. 9 is a photomicrograph at 200× showing the surface texture of a coupon subjected to pulsed current electrochemical machining in the experiment of Example 1.
Figure 10:
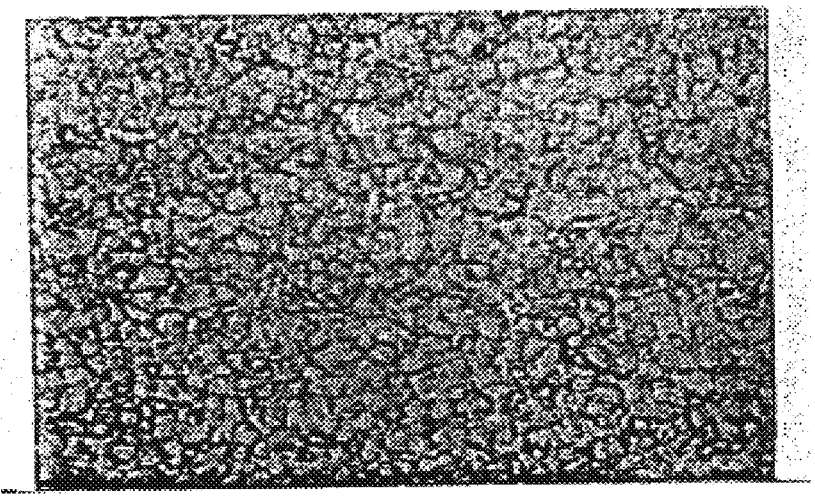
FIG. 10 is a photomicrograph at 200× showing the surface texture of a coupon subjected to electrochemical machining using the modulated reverse electric field method of the invention in the experiment of Example 1.

The quality of the surface produced by electrochemical machining is of great practical significance. Smooth, shiny surfaces are generally desired for industrial applications. Qualitative estimates of the surface quality are listed in Table 2. Both pulsed current machining and modulated reverse field machining produce a better surface appearance than direct current machining under the conditions of the experiment. The quality of the surface is indicated for each of the experiments. The experiments suggest that the surface quality is improved for shorter duty cycles for both pulsed current machining and modulated reverse field machining. The best surface appearance was achieved by modulated reverse field machining using a short duty cycle. FIGS. 8, 9 and 10 are photomicrographs at 200×(PMD Olympus microscope) which illustrate the surface quality produced by three of the experiments. FIG. 8 shows the microstructure of the surface produced by direct current machining (DC ECM) at 200×magnification. The surface is relatively rough, resulting in a dull gross appearance, as noted in Table 2. FIG. 9 shows the microstructure of the surface produced by pulsed current machining (PC ECM) at a 67% duty cycle (Experiment PC3), at 200×magnification. The surface is evidently more regular than that produced by DC machining, and is characterized as having a semi-shiny appearance. FIG. 10 shows the microstructure of the surface produced by modulated reverse field machining (MR-ECM) at a duty cycle of 33% (Experiment MRC4), at 200× magnification. The fine regular grain produced by this method is evident, and results in the very shiny appearance of this surface as noted in Table 2.

It is evident from the results of the comparative experiments reported in this example that modulated reverse field electrochemical machining is an effective method for removing metal from hard passive alloys. The method of the invention, when applied to electrochemical machining of hard passive alloys, can produce superior rates of metal removal, superior dimensional accuracy and better as-machined surfaces than conventional methods of electrochemical machining.

EXAMPLE 2

This example illustrates the superior surface smoothness achievable using electrochemical polishing with modulated reverse current.

Figure 11:
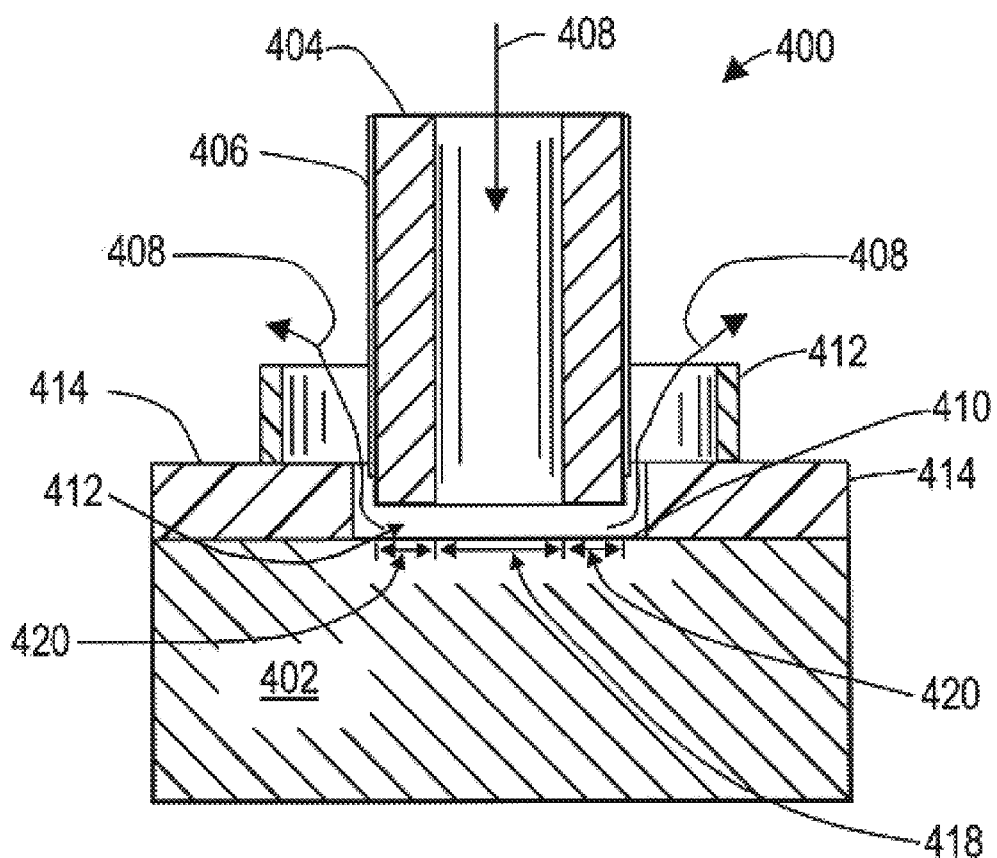
FIG. 11 is a schematic elevational cross-section view of the tool and workpiece used in the tests of Example 2.

The electrochemical machining apparatus used in Example 1 was used in a series of comparative experiments to test the surface smoothness achievable in electrochemical polishing using modulated reverse current as compared with direct current and pulsed current. The experimental arrangement of workpiece and tool is shown in FIG. 11. The tool (cathode) 404 was a stainless steel cylindrical tube of circular cross-section having an external diameter of 11.25 mm and a bore diameter of 4.75 mm. The tool was wrapped in insulating tape 406 for most of its length leaving only a small length of the outside of the tool 404 exposed at the lower end. The workpiece 402 was a coupon of IN718 alloy, a nickel-based hard passive alloy having a smooth planar upper surface 410. The upper surface was masked with an electrically insulating adhesive tape 414, thickness 3.135 mm, having a circular access hole 12.7 mm in diameter for the tool 404 to approach the workpiece 402. A skirt 412 made of a plastic material such as poly(methyl methacrylate) having a diameter of 19 mm and a height of 4 mm surrounded the access hole to assure that the gap and immediate surrounding area was kept flooded with electrolyte. The electrolyte flow pattern is indicated by the flow arrows 408. The tool 404 was positioned centrally in the access hole, and the gap 412 between the lower end of the tool 404 and the upper surface 410 of the workpiece 402 was adjusted to a predetermined value and was maintained at this value for the duration of the experiment. The electrolyte flow was adjusted to a predetermined rate of 1.6 gal/min (6.06 L/min), 1.8 gal/min (6.8 L/min), or 2.0 gal/min (7.6 L/min), as indicated. The temperature of the electrolyte was 100° F. (37.8° C.) or 110° F. (43.3° C.), as indicated. The electrochemical polishing was conducted using either DC, pulsed current (PC) or modulated reverse current (MRC). In each experiment the duration of the electropolishing was adjusted to provide a total anodic on-time of 20 seconds. The voltage during the forward (anodic) pulse was 20 volts, while the voltage during the reverse (cathodic) pulse was three volts. The parameters of the experiments are set forth in Table 3 below.

TABLE 3

| Test No. | Current type | Anodic time (ms) | Cathodic time (ms) | Off time | Gap (mm) | Temp. (° F.) | Flow rate (gal/min) | Current range (A) |
|---|---|---|---|---|---|---|---|---|
| 1 | DC |    |    |    | 0.325 | 100 | 1.6 | 53–63 |
| 2 | PC | 30 |    | 10 | 0.325 | 100 | 1.6 | 61–72 |
| 3 | MRC | 30 | 10 |    | 0.325 | 100 | 1.6 | 86–92 |
| 4 | DC |    |    |    | 0.525 | 110 | 2.0 | 41–45 |
| 5 | PC | 40 |    | 20 | 0.525 | 110 | 2.0 | 46–55 |
| 6 | MRC | 40 | 20 |    | 0.525 | 110 | 2.0 | 49–56 |
| 7 | MRC | 40 | 20 |    | 0.325 | 100 | 1.6 | 76–84 |
| 8 | MRC | 50 | 20 |    | 0.425 | 110 | 1.8 | 65–71 |

After each experiment the thickness of material removed was determined by measuring the depth of the depression in the surface of the coupon produced by the experiment. The surface of the electropolished area of the workpiece 402 was visually evaluated for shininess and smoothness. The surface roughness was quantitatively evaluated with a profilometer (SURFTEST SV502). The surface roughness measured by the profilometer is expressed as an Ra value, defined as the arithmetic mean of the absolute value of the distance from the mean line to the profile. The results of the experiments are set forth in Table 4 below and in FIGS. 12A, 12B, 13A, 13B, 14A, and 14B, which are photomicrographs showing the surfaces produced by certain of the experiments. Based on the flow pattern of the electrolyte, the electrochemically polished surface was divided into two regions for surface quality evaluation, as indicated in FIG. 11. The central area of the test surface where the electrolyte flow impinges directly on the workpiece surface 410 is identified in Table 4 and FIG. 11 as the P-area 418. The annular area surrounding the P-area 418, where the electrolyte flow is generally parallel to the workpiece surface 410, is identified in Table 4 and FIG. 11 as the J-area 420.

TABLE 4

| Test No. | Current type | Surface quality (visual) | | Micro-defects (Number of pits per 0.64 mm²) | | Surface roughness (Ra) (μm) | | Depth of material removed (μm) |
|---|---|---|---|---|---|---|---|---|
| | | P-area | J-area | P-area | J-area | P-area | J-area | |
| 1 | DC | ±+ | ±+ | 22 | 56 | 0.51 |      | 100–150 |
| 2 | PC | ±+ | ++ | 33 | 56 | 0.57 |      | 100–150 |
| 3 | MRC | ++ | ++ | 28 | 30 | 0.47 |      | 100–150 |
| 4 | DC | ±+ | ±+ | 27 | 36 | 0.18 | 0.36 | 90–130 |
| 5 | PC | ±+ | ±+ | 25 | 23 | 0.23 | 0.45 | 90–130 |
| 6 | MRC | ±+ | ++ | 20 | 16 | 0.20 | 0.24 | 90–130 |
| 7 | MRC | ++ | ++ | 18 | 22 |      |      | 100–140 |
| 8 | MRC | ++ | ++ | 10 | 23 |      |      | 100–130 |

++ = shiny and smooth
±+ = semi-shiny and smooth

Figure 12A:
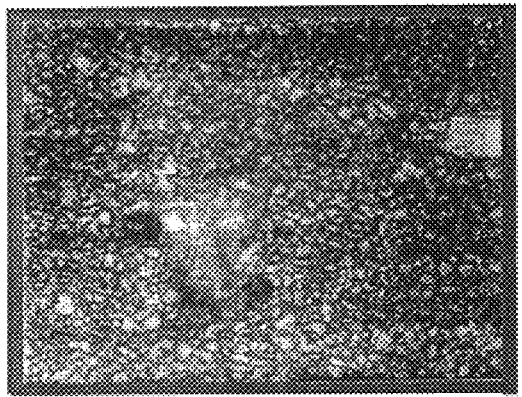
FIG. 12A is a photomicrograph at 200× showing the microstructure of the P-area of the test coupon after electropolishing using DC in Test 1 of Example 2.
Figure 12B:
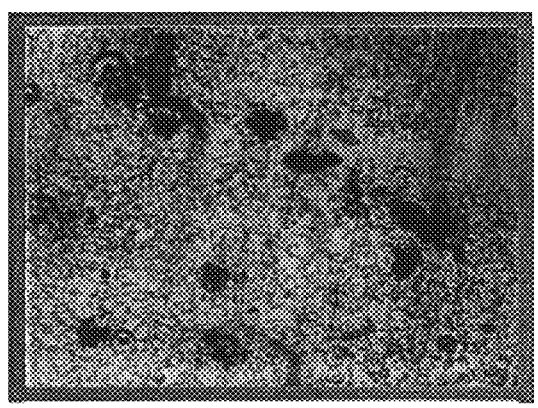
FIG. 12B is a photomicrograph at 200× showing the microstructure of the J-area of the test coupon after electropolishing using DC in Test 1 of Example 2.
Figure 13A:
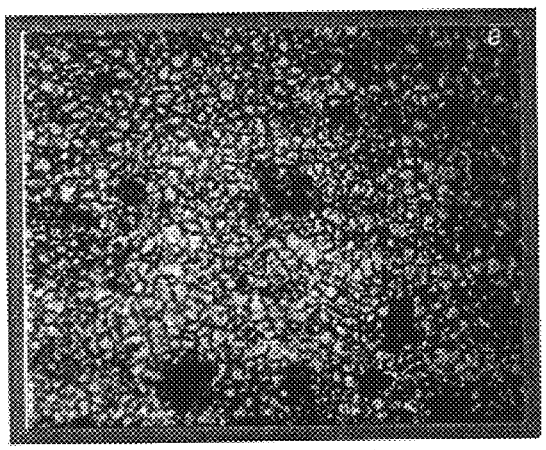
FIG. 13A is a photomicrograph at 200× showing the microstructure of the P-area of the test coupon after electropolishing using pulsed current (PC) in Test 2 of Example 2.
Figure 13B:
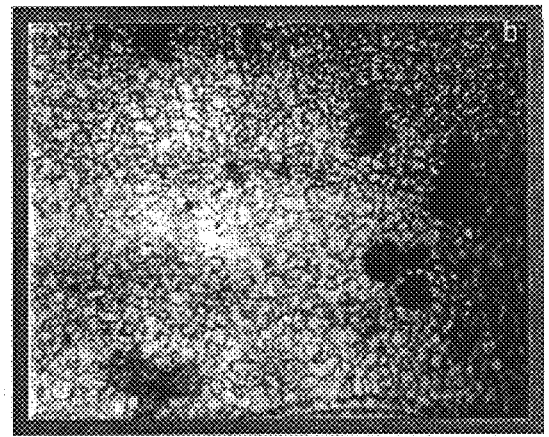
FIG. 13B is a photomicrograph at 200× showing the microstructure of the J-area of the test coupon after electropolishing using pulsed current (PC) in Test 2 of Example 2.
Figure 14A:
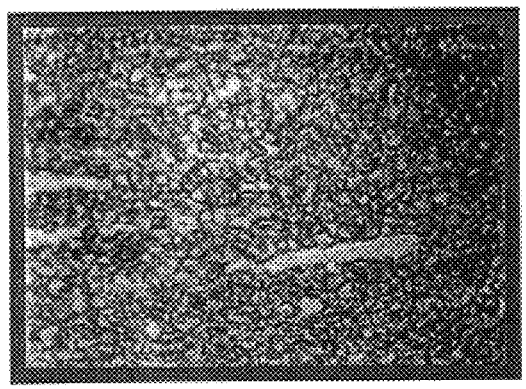
FIG. 14A is a photomicrograph at 200× showing the microstructure of the P-area of the test coupon after electropolishing using modulated reverse current (MRC) in Test 3 of Example 2.
Figure 14B:
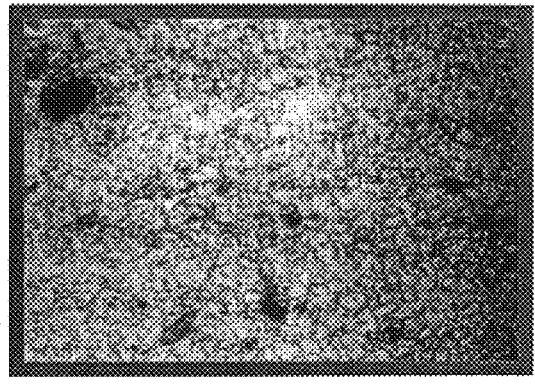
FIG. 14B is a photomicrograph at 200× showing the microstructure of the P-area of the test coupon after electropolishing using modulated reverse current (MRC) in Test 3 of Example 2.

The data establish that the surface formed by electropolishing using MRC is generally superior to that formed by either DC or PC electrochemical polishing. It is notable that the surface roughness for PC is generally greater than for DC, i.e., the surface quality is inferior. On the other hand MRC produces a surface that is smoother than either DC or PC electrochemical polishing. The superior quality of the surface achieved with MRC electrochemical polishing is also seen in the fewer number of defects and the general visual appearance of the surface, which appears smooth and shiny. The appearance of the surfaces prepared by DC, PC and MRC can also be compared by referring to FIGS. 12A, 12B, 13A, 13B, 14A and 14B. FIGS. 12A and 12B are micrographs at 200× of the P-area and J-area, respectively of the surface achieved using DC. FIGS. 13A and 13B are micrographs at 200× of the P-area 418 and J-area 420, respectively of the surface achieved using PC. FIGS. 14A and 14B are micrographs at 200× of the P-area and J-area, respectively of the surface achieved using MRC. A comparison of the micrographs readily reveals that the smoothest surface is achieved by using modulated reverse current (MRC).

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A method for electrochemical deburring of a metal substrate comprising
    interposing an electrolyte between a metallic substrate including burrs and an electrically conductive tool, and
    passing an electric current between said tool and said substrate to effect anodic dissolution of said burrs,
        wherein said electric current is a pulsed current comprised of anodic pulses and cathodic pulses wherein said cathodic pulses are interposed between at least some of said anodic pulses, said anodic pulses have a pulse width of from about 1 ms to about 50 ms and said anodic pulses have a frequency between about 5 Hertz and about 500 Hertz.

2. The method of claim 1 wherein an interval of no electric current flow is interposed between said anodic pulses and succeeding cathodic pulses.

3. The method of claim 1 wherein an interval of no electric current flow is interposed between said cathodic pulses and succeeding anodic pulses.

4. The method of claim 1 wherein an interval of no electric current flow is interposed between said anodic pulses and succeeding cathodic pulses and between said cathodic pulses and succeeding anodic pulses.

5. The method of claim 1 wherein said cathodic pulses and said cathodic pulses succeed each other without intervening intervals of no electric current flow.

6. The method of claim 1 wherein said anodic pulses have a frequency between about 10 Hertz and about 300 Hertz.

7. The method of claim 1 wherein said anodic pulses have a frequency between about 10 Hertz and about 100 Hertz.

8. The method of claim 1 wherein said anodic pulses have a pulse width of from about 1 ms to about 30 ms.

9. The method of claim 1 having an anodic duty cycle of from about 5% to about 60%.

10. The method of claim 9 wherein said anodic duty cycle is from about 10% to about 35%.

11. The method of claim 1 wherein said cathodic pulses have a pulse width from about 5 ms to about 150 ms.

12. The method of claim 11 wherein said cathodic pulses have a pulse width from about 5 ms to about 50 ms.

13. The method of claim 1 having a cathodic duty cycle of from about 5% to about 60%.

14. The method of claim 13 having a cathodic duty cycle of from about 10% to about 35%.

15. The method of claim 1 wherein said substrate is comprised essentially of metal.

16. The method of claim 1 wherein said substrate is a passive metal.

17. The method of claim 16 wherein said metal is selected from the group consisting of nickel, nickel alloys, cobalt, cobalt alloys, chromium, chromium alloys, stainless steel, molybdenum, molybdenum alloys, titanium, titanium alloys, aluminum, and aluminum alloys.

* * * * *